United States Patent [19]

Sola

[11] Patent Number: 5,784,196
[45] Date of Patent: Jul. 21, 1998

[54] ACTIVE/PASSIVE SIGNATURE ENHANCER (APSE)

[75] Inventor: Marcos C. Sola, Ft. Washington, Md.

[73] Assignee: The United States of America as represented by the Secretary of the Army, Washington, D.C.

[21] Appl. No.: 749,755

[22] Filed: Oct. 28, 1996

[51] Int. Cl.$^6$ .................................................. G02B 5/122
[52] U.S. Cl. .......................... 359/529; 359/530; 359/522
[58] Field of Search .................................... 359/515, 520, 359/522, 527, 529–536, 546–553; 342/5–11; 404/9, 12, 16

[56] References Cited

U.S. PATENT DOCUMENTS

| | | | |
|---|---|---|---|
| 3,603,686 | 9/1971 | Wyman et al. | 356/152 |
| 4,131,791 | 12/1978 | Lego, Jr. | 250/199 |
| 4,823,131 | 4/1989 | Bell | 342/7 |

*Primary Examiner*—James Phan
*Attorney, Agent, or Firm*—Paul S. Clohan

[57] ABSTRACT

A device that will enhance the signature of a target by utilizing retroreflective articles and can operate in an "active" or "passive" mode. The device consists of a sphere on which a number of corner cube reflectors are mounted. The sphere is then mounted on top of the target and, in the "active mode", is rotated around its vertical axis. The sphere is then illuminated by a laser and the reflected energy is received by an appropriate electro-optical sensor, such as an image intensifier or a FLIR. In the "passive" mode, the sphere is either rotated around its horizontal axis, or remains stationary, and the reflected ambient radiation is received by an appropriate sensor.

9 Claims, 4 Drawing Sheets

ACTIVE/PASSIVE SIGNATURE ENHANCER (APSE)

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to Identification Friend or Foe (IFF) systems, to target acquisition systems, and to search and rescue systems.

Past search and rescue systems have generally been based upon the use of omni-directional radios, such as a locator beacon deployed with the person or object to be located. There are several drawbacks inherent in such systems. First, the person desiring to be located has no way of knowing when a searcher is within range of his transmitter and thus, to maximize his chances of rescue, must operate the transmitter for long periods when there are no receivers within range and this is wasteful of power. Further, in a military or police situation, the person desiring to be located does not want to give his position away to an enemy. Also, omni-directional transmitters are very difficult to locate from a single search station such as an aircraft and, at best, can direct the searchers only to a general location rather than to the specific point where the locator unit is positioned.

Retroreflective articles are used extensively for making highway signs, street signs, pavement markings, etc. Retroreflective articles comprising an array of cube corner retroreflective elements are now well known in the art. Cube corner retroreflective elements are prism structures which have three mutually perpendicular faces meeting at a single corner, such as that configuration defined by the corner of a room or the corner of a cube. Cube corner elements operate according to the principle of total internal reflection. That is, a cube corner element receives a ray of incident light from a source and sends it back toward the same source in a direction substantially parallel to the ray of incident light.

Prior art search and rescue systems utilizing retroreflective articles have been attempted which utilize a search station for transmitting radiation from a search beacon, a locator means including a retro-reflector for reflecting a portion of the radiation of the search beacon back to the search station, a detector means included in the locator means for generating an indication signal in response to the radiation from the search beacon to indicate that the locator means is positioned within the search beacon, and a receiving means at the search station for detecting the reflected radiation and for generating a detection output in response thereto. The locator means was provided with a shutter device arranged to control the reflection properties of the retro-reflector whereupon the operator of the locator means is provided with the ability to modulate the radiation reflected to the search station. The problem with this prior art device was that it required the active participation from the person to be rescued, and it was highly directional.

BRIEF SUMMARY OF THE INVENTION

It is therefore an object of the present invention to increase the detection capability of search and rescue or surveillance systems.

Another object of the invention is to reduce the detection timeline in search and rescue or surveillance systems.

A further object of the present invention is to lower the false alarm rate on search and rescue or surveillance systems.

A still further object is to increase the survivability rate of persons in distress.

Another object is to provide a device that will identify a friendly vehicle from an unfriendly vehicle in military or police environments.

Still other objects and advantages of the present invention will become readily apparent to those skilled in this art from the detailed description, wherein only the preferred embodiment of the present invention is shown and described, simply by way of illustration of the best mode contemplated of carrying out the present invention. As will be realized, the present invention is capable of other and different embodiments, and its several details are capable of modifications in various obvious respects, all without departing from the present invention. Accordingly, the drawings and descriptions are to be regarded as illustrative in nature, and not as restrictive.

These and other objects are achieved by an Active/Passive Signature Enhancer (APSE) device that will enhance the signature of a target by utilizing retroreflective articles and can operate in an "active" or "passive" mode. The APSE itself is a single sphere or a pair of coaxial spheres on which a number of corner cube reflectors are mounted. The APSE is then mounted on top of the target and, in the "active mode", is rotated around its vertical axis. The APSE is then illuminated by a laser and the reflected light is sensed by an appropriate sensor, such as a night vision device. In the "passive mode" the APSE is rotating around its horizontal axis and is being viewed by a passive sensor only, or the APSE is not rotating and is being viewed by a sensor plus an illuminator.

DETAILED DESCRIPTION OF THE INVENTION

Figure 1:
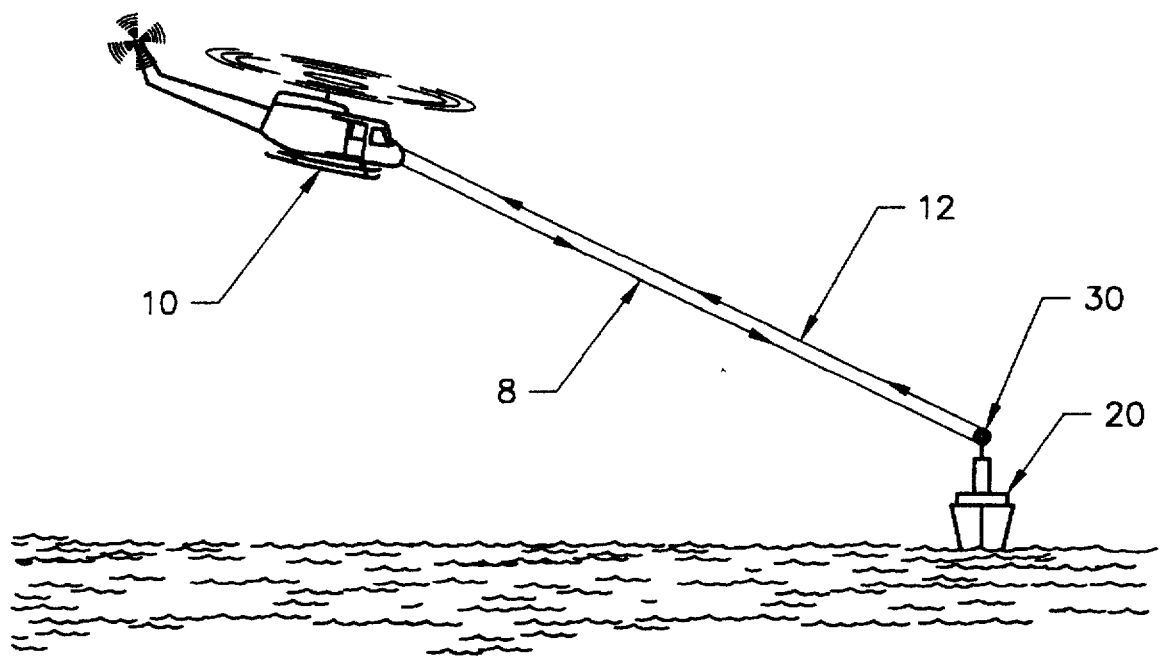
FIG. 1 depicts a typical search and rescue scenario in which a rescue helicopter is searching for a vessel which is lost or in distress.

Referring now to FIG. 1, there is shown a typical search and rescue scenario in which rescue helicopter 10 is searching for vessel 20 which is in distress or lost. Helicopter 10 has an existing imaging system having a co-located, co-boresighted, in-band illuminator, which emits outgoing laser beam 8 that is reflected off Active/Passive Signature Enhancer 30 returning incoming laser beam 12. One type of existing imaging system is a thermal far-infrared imaging sensor that has a carbon dioxide ($CO_2$) laser, while another type of existing imaging system is an image intensifier with a Gallium Aluminum Arsenide (GaAlAs) laser. One such prototype system, known as FOXFIRE 01 utilizes a AN/TAS-6, Night Observation Device, Long Range combined with a $CO_2$ laser having a peak power rating of 2 Watts. Another such prototype system, known as FOXFIRE 02 utilizes a AN/TVS-5, Crew Served Weapon Sight combined with a GaAlAs laser having a peak power of 100 mWatts.

Figure 2:
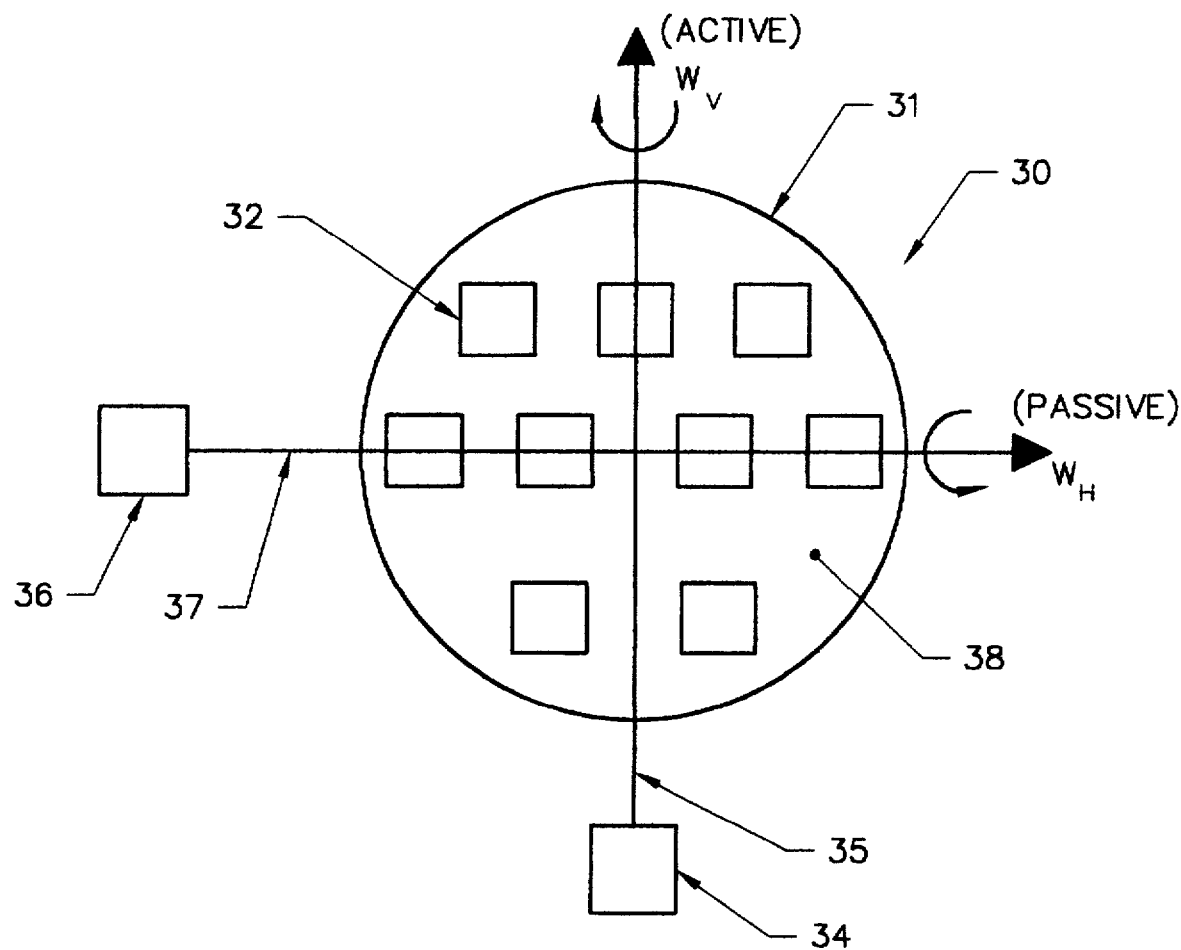
FIG. 2 depicts a first embodiment of an Active/Passive Signature Enhancer (APSE) according to the present invention.

FIG. 2 shows one embodiment of an Active/Passive Signature Enhancer 30 according to the teachings of the present invention. Active/Passive Signature Enhancer 30 consists of a spherical housing 31 that contains at least one corner cube reflector 32 attached along its central axis; more corner cube reflectors 32 can be attached, as shown, and the corner cube reflectors 32 can be attached on the upper and lower hemispheres of sphere 31 on axes parallel to the horizontal axis of sphere 31. The number of corner cube reflectors 32 selected and their spatial and angular placement will provide a coded reflected signal when Active/Passive Signature Enhancer 30 is operating in the "active" mode. The space on sphere 31 between corner cube reflectors 32 consists of a non-reflecting zone 38. The "active" mode of Active/Passive Signature Enhancer 30 is when sphere 31 is made to rotate at velocity $W_v$ with respect to the vertical axis by motor 34 and illuminated by the laser in the sensor on rescue vehicle 10.

Figure 3:
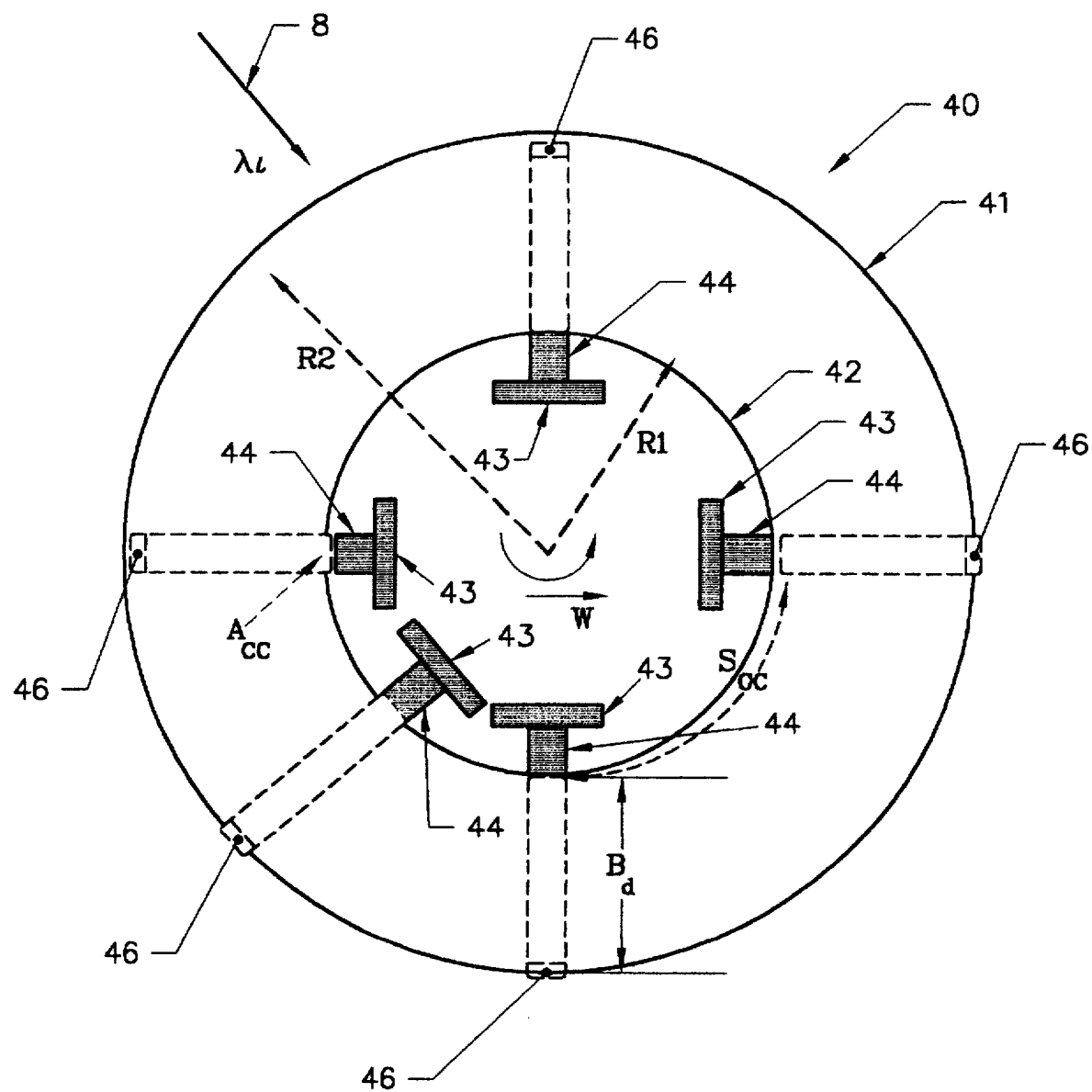
FIG. 3 depicts a second embodiment of an Active/Passive Signature Enhancer (APSE) with a higher fidelity according to the present invention.

In order to insure a positive, distinct signal return from the Active/Passive Signature Enhancer, a higher fidelity version 40 of the APSE is shown in FIG. 3. APSE 40 consists of two concentric spherical housings 41 and 42 of radius $R_1$ and $R_2$ which are fixed in relation to each other at distance $B_d$ which is the difference between radius $R_1$ and $R_2$. At least one corner cube reflector 43 is mounted on inner spherical housing 42. Each corner cube reflector 43 has a baffle 44 having an aperture $A_{CC}$, and if more than one corner cube reflector 43 is used, they are separated by distance $S_{CC}$. Baffle 44 allows corner cube reflector 43 to face radially outward to the surface of housing 41 and allows for a unique or coded return. In the "active mode" APSE 40 is rotating with an angular velocity $W_v$ about the axis perpendicular to FIG. 3, i.e., rotating around its vertical axis. Outer spherical housing 41 is essentially a "protective cover" for inner sphere 42 and baffle cover 46 has a wide dynamic transparent range to the incident laser energy beam 8 having a wavelength $\lambda_i$. Thus protective cover 41 plus baffle cover 46 protects corner cube reflectors 43 from the environment such as dust, dirt, and other debris that would otherwise be detrimental to the reflective property of the cubes.

Figure 4:
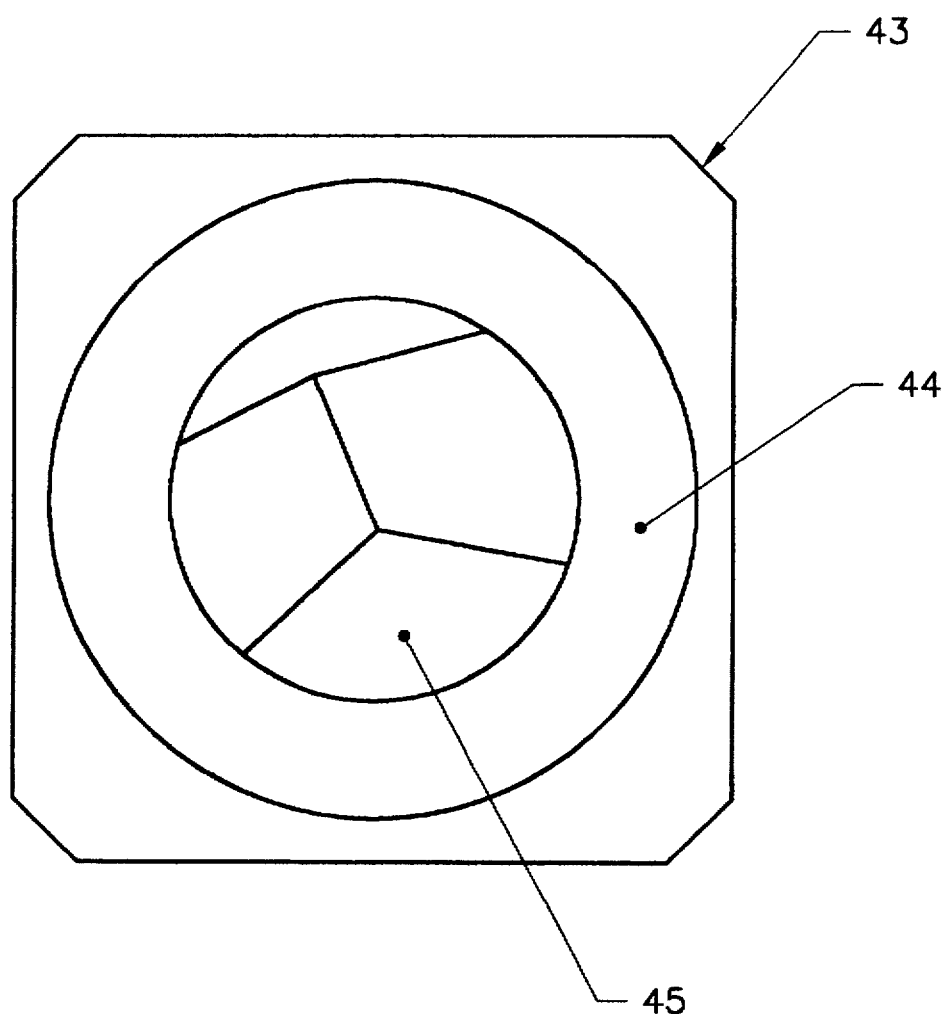
FIG. 4 shows a top view of a corner cube reflector for use in the Active/Passive Signature Enhancer (APSE) of FIG. 3.

FIG. 4 shows the type of corner cube reflectors 43 used in the APSE 40 embodiment of FIG. 3. The reflector surface 45 is contained within cylindrical baffle 44 of corner cube reflector 43. A suitable corner cube reflector 43 is a UBBR 1-5 Broadband Retroreflector (Parallelism: 5 seconds) made by NEWPORT.

The number of positive, distinct codes that can be created for a fixed angular frequency $W_v$ is optimized by the selection of the size and number of corner cube reflectors 43, the corner cube separation distance $S_{CC}$ along the circumference of inner sphere 42, and baffle 44 length $B_d$. Additional codes could be added to the above for integral number (n) of the angular frequency, i.e., $n*W_v$; where n=1, 2, 3, ....

For maritime search and rescue in a target rich scenario such as the littoral environment, Active/Passive Signature Enhancer 30 or 40 would be used to augment equipments on board vessel 20 (GPS, VHF, EPIRB, etc.) in order to allow the rescuer to identify and find a vessel 20 in distress. For nighttime search and rescue, the variation in the coded signal provides for an indication of the sea roughness condition, an important factor to know when a helo lift-off of survivors is planned. In the "passive" mode, the detection timeline could still be made short due to the wave action causing a starlike "twinkling" effect (an AC signal) in a predominantly DC background. Even at low signal to clutter, this "twinkling" effect will be a good cue for detection to those searching for the distressed vessel. Rotation of the APSE in the horizontal axis may provide an AC signal provided there is enough contrast in the vertical, e.g., sky vs. water, in terms of reflected light level or temperature difference, depending upon the passive sensor in use (without the illuminator).

The military applications of the Active/Passive Signature Enhancer 30 or 40 would be as follows. Active/Passive Signature Enhancer 30 or 40, when interrogated by a surveillance platform, such as helicopter 10, which could be an attack helicopter at a stand-off range, will allow positive identification of friend from foe between two opposing forces engaging at tactical range. For most of the engagement scenarios, the enemy forces, even with night vision devices (FLIRS or image intensifiers) comparable to those of the friendly forces, will not be able to intercept the reflected laser energy from the Active/Passive Signature Enhancer mounted on the top of a friendly force ground weapon platform such as a tank. This will result in reduction in fratricide from friendly fire. This technique for IFF is an improvement to the IFF used in Desert Storm such as thermal tapes, rotating hot plates, and IR lights. These IFF techniques would actually be a liability (in terms of being detected by the enemy) had the enemy force owned better night vision devices and had the tactical opportunity to use them to service their targets.

For law enforcement use, State or Federal vehicles can be vectored to and distinguished from criminal vehicles (drug traffickers, immigrant smuggling, etc) in situations where a close proximity engagement scenario is occurring.

It will be readily seen by one of ordinary skill in the art that the present invention fulfills all of the objects set forth above. After reading the foregoing specification, one of ordinary skill will be able to effect various changes, substitutions of equivalents and various other aspects of the present invention as broadly disclosed herein. It is therefore intended that the protection granted hereon be limited only by the definition contained in the appended claims and equivalents thereof.

Having thus shown and described what is at present considered to be the preferred embodiment of the present invention, it should be noted that the same has been made by way of illustration and not limitation. Accordingly, all modifications, alterations and changes coming within the spirit and scope of the present invention are herein meant to be included.

I claim:

1. A device to enhance the signature of a target comprising:
   a first spherical housing;
   a second spherical housing surrounding said first spherical housing and coaxial with said first spherical housing;
   at least one retroreflective surface attached to said first spherical housing such that said retroreflective surface is visible through said second spherical housing.

2. The device of claim 1 wherein said at least one retroreflective surface is visible through said second spherical housing by means of a baffle.

3. The device of claim 2 wherein said at least one retroreflective surface attached to said first spherical housing is located pointed radially outward from said first spherical housing.

4. The device of claim 3 further comprising additional retroreflective surfaces attached on the horizontal axis of said first spherical housing, each visible through said second spherical housing by means of a baffle.

5. The device of claim 4 further comprising means to rotate said first and second spherical housings.

6. A system to enhance the signature of a target comprising:

a mountable object comprising a first spherical housing, a second spherical housing surrounding said first spherical housing and coaxial with said first spherical housing, and at least one retroreflective surface attached to said first spherical housing such that said retroreflective surface is visible through said second spherical housing;

means to direct a beam of energy at said mountable object;

means to receive reflected energy from said retroreflective surface.

7. The system of claim 6 further comprising means to rotate said mountable object.

8. The system of claim 7 wherein said means to direct a beam of energy at said mountable object comprises a laser.

9. The system of claim 8 wherein said means to receive the reflected energy from said retroreflective surface comprises an electro-optical sensor.

* * * * *